(12) United States Patent
Park et al.

(10) Patent No.: US 7,960,073 B2
(45) Date of Patent: Jun. 14, 2011

(54) MEMBRANE ELECTRODE ASSEMBLY FOR FUEL CELL AND FUEL CELL SYSTEM INCLUDING THE SAME

(75) Inventors: Young-Mi Park, Yongin-si (KR); Sung-Guk An, Yongin-si (KR); You-Mee Kim, Yongin-si (KR); Ho-Jin Kweon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1020 days.

(21) Appl. No.: 11/607,335

(22) Filed: Nov. 30, 2006

(65) Prior Publication Data
US 2007/0122688 A1    May 31, 2007

(30) Foreign Application Priority Data

Nov. 30, 2005   (KR) .................. 10-2005-0115818

(51) Int. Cl.
*H01M 4/36* (2006.01)
(52) U.S. Cl. ........................................ 429/530; 429/523
(58) Field of Classification Search .................. 429/42
See application file for complete search history.

(56) References Cited

U.S. PATENT DOCUMENTS

| | | | | |
|---|---|---|---|---|
| 4,394,498 A * | 7/1983 | Kastelic | ................... | 528/193 |
| 4,402,996 A * | 9/1983 | Gauger et al. | ................ | 427/125 |
| 5,133,842 A * | 7/1992 | Taylor et al. | ................... | 205/532 |
| 5,783,325 A * | 7/1998 | Cabasso et al. | ............... | 429/524 |
| 6,733,915 B2 * | 5/2004 | Barton et al. | ................. | 429/481 |
| 6,840,969 B2 * | 1/2005 | Kobayashi et al. | .......... | 29/623.2 |
| 2005/0238948 A1* | 10/2005 | Mei et al. | ......................... | 429/40 |
| 2006/0121333 A1* | 6/2006 | Yano et al. | ...................... | 429/42 |
| 2006/0251945 A1* | 11/2006 | Song et al. | ...................... | 429/33 |
| 2007/0009777 A1 | 1/2007 | Kono et al. | | |

FOREIGN PATENT DOCUMENTS

| | | |
|---|---|---|
| CA | 2238738 | 5/1998 |
| JP | 2002-298867 | 10/2002 |
| KR | 1999-0071833 | 9/1999 |
| KR | 10-2004-0036461 | 4/2004 |
| WO | WO 2004/102713 A1 | 11/2004 |

OTHER PUBLICATIONS

The description of mesophase pitch, Carbon-Carbon Materials and Composites, Buckley, J.D.; Edie, D.D. , William Andrew Publishing/Noyes, 1993, p. 28.*
Patent Abstracts of Japan, Publication No. 2002-298867; Date of Publication: Oct. 11, 2002; in the name of Yoichi Asano et al.
Korean Patent Abstracts, Publication No. 1020040036461 A; Date of Publication: Apr. 30, 2004; in the name of Hye Gyeong Kim et al.

\* cited by examiner

*Primary Examiner* — Cynthia Lee
(74) *Attorney, Agent, or Firm* — Christie, Parker & Hale, LLP

(57) ABSTRACT

The membrane-electrode assembly of the present invention includes an anode and a cathode facing each other, and a polymer electrolyte membrane interposed therebetween. At least one of the anode and the cathode includes an electrode substrate and a metal catalyst layer disposed thereon. The metal catalyst layer includes a metal catalyst and a liquid crystal material.

15 Claims, 2 Drawing Sheets

MEMBRANE ELECTRODE ASSEMBLY FOR FUEL CELL AND FUEL CELL SYSTEM INCLUDING THE SAME

CROSS-REFERENCE TO RELATED APPLICATION

This application claims priority to and the benefit of Korean Patent Application No. 10-2005-0115818 filed in the Korean Intellectual Property Office on Nov. 30, 2005, the entire content of which is incorporated herein by reference.

FIELD OF THE INVENTION

The present invention relates to a membrane-electrode assembly for a fuel cell and a fuel cell system including the same.

BACKGROUND OF THE INVENTION

A fuel cell is a power generation system for producing electrical energy through an electrochemical redox reaction of an oxidant and a fuel such as hydrogen, or a hydrocarbon-based material such as methanol, ethanol, natural gas, and the like. The polymer electrolyte fuel cell is a clean energy source that is capable of replacing fossil fuels. It has advantages such as high power output density and energy conversion efficiency, operability at room temperature, and being small-sized and tightly sealed. Therefore, it can be applicable to a wide array of fields such as non-polluting automobiles, electricity generation systems, and portable power sources for mobile equipment, military equipment, and the like.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has advantages of high energy density and high power, but also has problems in the need to carefully handle hydrogen gas and the requirement of accessory facilities, such as a fuel reforming processor, for reforming methane or methanol, natural gas, and the like in order to produce hydrogen as the fuel gas.

On the contrary, a direct oxidation fuel cell has a lower energy density than that of the gas-type fuel cell but has the advantages of easy handling of the liquid-type fuel, a low operation temperature, and no need for additional fuel reforming processors. Therefore, it has been acknowledged as an appropriate system for a portable power source for small and common electrical equipment.

In the above-mentioned fuel cell system, a stack that generates electricity substantially includes several to many unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode" ) and a cathode (also referred to as an "air electrode" or a "reduction electrode" ) that are separated by a polymer electrolyte membrane.

A fuel is supplied to an anode and adsorbed on catalysts of the anode, and the fuel is oxidized to produce protons and electrons. The electrons are transferred into a cathode via an out-circuit, and the protons are also transferred into the cathode through the polymer electrolyte membrane. In addition, an oxidant is supplied to the cathode, and then the oxidant, the protons, and the electrons are reacted on catalysts of the cathode to produce electricity along with water.

SUMMARY OF THE INVENTION

One embodiment of the present invention provides a membrane-electrode assembly that can maximize catalyst efficiency due to increased reaction areas and easily implement the supply of fuel and removal of reaction products resulting in a fuel cell with excellent output characteristics.

Another embodiment of the present invention provides a fuel cell system including the membrane-electrode assembly.

According to one embodiment of the present invention, a membrane-electrode assembly for a fuel cell is provided that includes an anode and a cathode facing each other and a polymer electrolyte membrane interposed therebetween. At least one of the anode and the cathode includes an electrode substrate and a metal catalyst layer disposed thereon and includes a metal catalyst and a liquid crystal material.

According to another embodiment of the present invention, a fuel cell system is provided, which includes at least one electricity generating element, a fuel supplier, and an oxidant supplier. The electricity generating element includes a membrane-electrode assembly and separators arranged at each side thereof. It generates electricity through oxidation of a fuel and reduction of an oxidant. The fuel supplier plays a role of supplying the electricity generating element with a fuel including hydrogen, and the oxidant supplier plays a role of supplying the electricity generating element with an oxidant.

DETAILED DESCRIPTION OF THE INVENTION

An exemplary embodiment of the present invention will hereinafter be described in detail with reference to the accompanying drawings.

The present invention can increase the reaction area of a catalyst layer by adding a liquid crystal material that is arranged in a predetermined direction in an electric field with respect to a catalyst layer. Reactants such as a fuel and an oxidant, and discharge reaction products such as carbon dioxide and water due to vertical arrangements of liquid crystal materials in a catalyst layer during the operation of a fuel cell are provided. Accordingly, the present invention can improve the power characteristics of a fuel cell.

The membrane-electrode assembly according to one embodiment of the present invention includes a cathode, an anode, and a polymer electrolyte membrane interposed therebetween.

At least one of the anode and cathode includes an electrode substrate, a catalyst layer disposed thereon that includes a liquid crystal material, and a metal catalyst.

Figure 1:
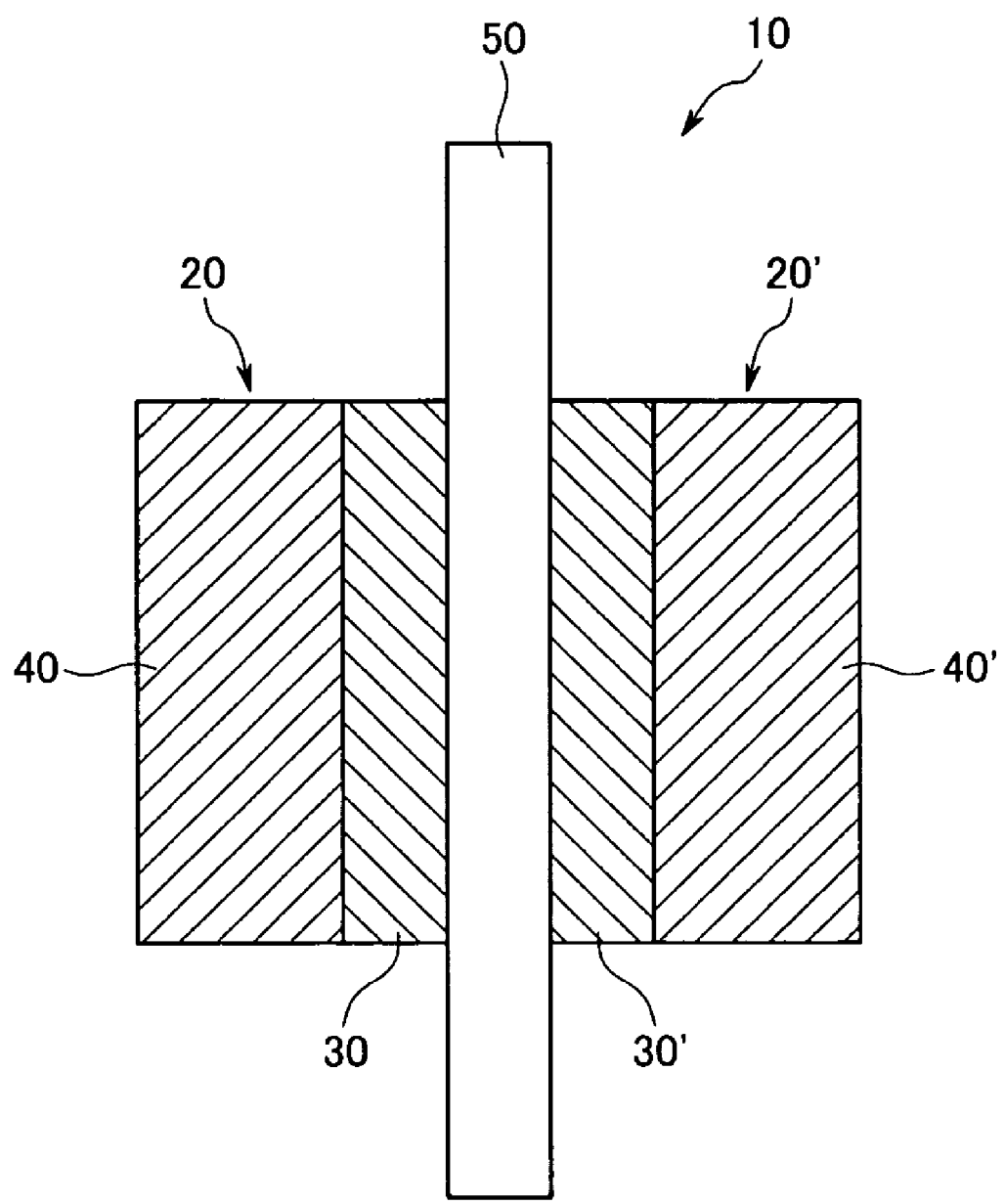
FIG. 1 is a schematic view showing a membrane-electrode assembly according to one embodiment of the present invention.

FIG. 1 is a schematic cross-sectional view showing a membrane-electrode assembly according to one embodiment of the present invention.

Referring to FIG. 1, the membrane-electrode assembly 10 according to one embodiment of the present invention includes a polymer electrolyte membrane 50 and electrodes 20 and 20' disposed on each side of the polymer electrolyte membrane 50. The electrodes include electrode substrates 40 and 40' and catalyst layers 30 and 30' disposed on the surfaces of the electrode substrates.

In the membrane-electrode assembly 10, the electrode 20 disposed on one surface of the polymer electrolyte membrane 50 refers to an anode (or a cathode) and the electrode 20' disposed on the other surface of the polymer electrolyte membrane 50 refers to a cathode (or an anode). Fuels are transferred to the catalyst layer 30 of the anode 20 through the electrode substrate 40 and are oxidized to produce protons and electrons. The protons produced at the anode 20 are transferred to the cathode 20' through the polymer electrolyte membrane 50. At the cathode 20', the protons transferred through the polymer electrolyte membrane 50 are reacted with oxidants transferred to the catalyst layer 30' through the electrode substrate 40' to produce water.

The catalyst layers 30 and 30' help the related reaction (oxidation of a fuel and reduction of an oxidant) and the catalyst layers 30 and 30' include a liquid crystal material and a metal catalyst.

The liquid crystal material is arranged in a direction due to characteristics of its molecular structure, and the liquid crystal material is linearly arranged in the catalyst layer in an electric field and is capable of rotation on a 90° basis. Since the liquid crystal material is operated by a low voltage ranging from several to many volts, it is vertically arranged together with a catalyst upon operation of a fuel cell, and increases the catalyst reaction area. Also, since the vertical arrangement provides a path for the fuel and the oxidant, reactants can be supplied and discharged easily.

In one embodiment, the liquid crystal material has a form of a nano node, and it may have an aspect ratio in the range of 1:5 to 1:20, and in another embodiment, in the range of 1:7 to 1:15. Within the aspect ratio range, the liquid crystal material can easily provide a path for the reactants through the arrangement of the liquid crystal material. Out of the aspect ratio range, a uniform vertical arrangement is not consistently formed, which is undesirable. When the aspect ratio is too small, the effect obtained from the arrangement of the liquid crystal material can hardly be obtained, which is undesirable.

In one embodiment, the liquid crystal material may have an average length shorter than 50 nm, and in another embodiment, in the range of 30 to 50 nm. When the average length of liquid crystal material is longer than 50 nm it is difficult to form the arrangement, which is undesirable.

The liquid crystal material includes monomer or polymer materials. Specific, non-limiting examples of the liquid crystal material include at least one selected from the group consisting of cholesteryl benzoate, para-azoxyphenetol, para-methoxy cinnamic acid, sodium oleate, polyamides, polybenzothiazole, aromatic polyesters, poly(alkyl) glutamate, and combinations thereof. In one embodiment, when the liquid crystal material is a polymer material, it has a weight average molecular weight in the range of 1,000 to 200,000.

In an embodiment, the liquid crystal material is included in an amount of 2 to 20 parts by weight with respect to 100 parts by weight of the metal catalyst in the catalyst layer. According to another embodiment, the liquid crystal material is included in an amount of 5 to 10 parts by weight with respect to 100 parts by weight of the metal catalyst. When the amount of the liquid crystal material is less than 2 parts by weight, an arrangement effect of the liquid crystal material is negligible, whereas, when it is more than 10 parts by weight, the liquid crystal materials are bound to each other resulting in a decrease of the reaction surface area.

In one embodiment, the metal catalyst may include at least one material selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. The anode and the cathode may include the same catalyst. However, in a direct oxidation fuel cell, since an anode catalyst may be poisoned by CO, CO-tolerant platinum-ruthenium alloy catalysts may be suitably used as an anode catalyst. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

In one embodiment, the metal catalyst may be used in a form of a metal itself (black catalyst), or one supported on a carrier. The carrier may include carbon such as graphite, denka black, ketjen black, acetylene black, carbon nanotubes, carbon nanofiber, carbon nanowire, carbon nanoballs, activated carbon, or an inorganic particulate such as alumina, silica, zirconia, or titania. Carbon is generally used.

In one embodiment, the metal catalyst may be included at 50 to 80 wt % with respect to the total weight of the catalyst layer, and in another embodiment, at 60 to 70 wt %. When the metal catalyst is included at less than 50 wt %, and the reaction area becomes small, which is undesirable. When it is included at more than 80 wt %, the adherence of the catalyst layer is deteriorated to thereby causes loss in the catalyst layer, which is also undesirable.

In an embodiment, the catalyst layer may further include a binder resin having ion conductivity to improve adherence to the polymer electrolyte membrane and the proton transferring properties.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the polymer include at least one proton conductive polymer selected from the group consisting of perfluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, and polyphenylquinoxaline-based polymers.

In one embodiment, the binder resin is included in an amount of 10 to 40 parts by weight based on 100 parts by weight of the metal catalyst. According to another embodiment, the binder resin is included in an amount of 15 to 25 parts by weight based on 100 parts by weight of the metal catalyst. When the amount of the binder resin is less than 10 parts by weight, ion transferring properties are insufficient, and the binding force for catalysts decreases, whereas, when it is more than 40 parts by weight, the reaction area of the catalyst decreases.

In one embodiment, the catalyst layer described above has a thickness of less than or equal to 400 μm, and an another embodiment in the range of 50 to 400 μm. When the thickness of the catalyst layer is more than 400 μm, fuel is not easily supplied and released.

The catalyst layer is supported by the electrode substrate. The electrode substrates of the anode and the cathode support the anode and cathode, respectively, and provide a path for transferring a fuel and an oxidant to the catalyst layer. As for the electrode substrates, a conductive substrate is used, for example carbon paper, carbon cloth, carbon felt, or metal cloth (a porous film including a metal cloth fiber or a metalized polymer fiber), but is not limited thereto.

In one embodiment, the electrode substrates may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, polyfluoroethylene or copolymers thereof, but is not limited thereto.

In one embodiment, a microporous layer (MPL, not shown) can be added between the aforementioned electrode substrates and the catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof. The microporous layer is formed by coating a composition comprising a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

In one embodiment, the electrode with the above structure can be applied as either one of an anode and a cathode, and in an embodiment as both an anode and a cathode.

A membrane/electrode assembly including the above electrode includes a polymer electrolyte membrane 50 between an anode and a cathode.

The polymer electrolyte membrane 50 plays a role of exchanging ions by transferring protons produced at an anode catalyst layer to a cathode catalyst layer. The polymer electrolyte membrane may include any polymer resin having proton conductivity. The proton conductive polymers may be polymer resins having a cation exchange group selected from the group consisting of a sulfonic acid group, a carboxylic acid group, a phosphoric acid group, a phosphonic acid group, and derivatives thereof, at its side chain.

According to one embodiment of the present invention, the proton conductive polymers have an ion exchange ratio in the range of 3 to 33 and an equivalent weight (EW) in the range of 700 to 2,000. The "ion exchange ratio of the ion exchange resin" is defined as the number of carbons in the polymer backbone and the number of cation exchange groups. The ion-exchange ratio value of 3 to 33 corresponds to an equivalent weight (EW) of 700 to 2,000.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole).

H can be replaced with Na, K, Li, Cs, or tetrabutyl ammonium in a proton conductive group of the proton conductive polymer. When H is substituted by Na in an ion exchange group at the terminal end of the proton conductive group, NaOH is used. When H is replaced with tetrabutyl ammonium, tributyl ammonium hydroxide is used. K, Li, or Cs can also be replaced by using appropriate compounds. A method of substituting H is known in this related art, and thereby is not further described in detail.

In one embodiment, the polymer electrolyte membrane has a thickness in the range of 10 µm to 200 µm.

Since the preparation methods and conditions of the polymer electrolyte membrane are widely known to those skilled in the art of the present invention, detailed descriptions of them will not be provided herein.

According to another embodiment of the present invention, a membrane-electrode assembly is prepared by using a composition for forming a catalyst layer including a liquid crystal material, a metal catalyst, and a solvent to form a catalyst layer in an electrode substrate or a polymer electrolyte membrane.

The composition for forming a catalyst layer is prepared by mixing the metal catalyst and the liquid crystal material in the solvent. The metal catalyst and the liquid crystal material used herein are the same as described above.

As for the solvent, water or alcohol such as ethanol, isopropyl alcohol, ethanol, n-propyl alcohol, and butanol may be used. In one embodiment, a mixed solution of water and 2-propanol may be used. The solvent may be used in an appropriate quantity such that the catalyst layer forming composition has an appropriate viscosity to form the catalyst layer. In an embodiment, the solvent may be 200 to 600 parts by weight with respect to 100 parts by weight of the metal catalyst. In another embodiment, the solvent may be 300 to 400 parts by weight. When the solvent is more than 600 parts by weight, the viscosity is deteriorated and fluidity is increased. Thus, it is not appropriate for coating of a uniform area. When it is less than 300 parts by weight, high viscosity deteriorates printing properties, which is not desirable either.

The composition for forming a catalyst layer may optionally further include a binder resin as described before. In one embodiment, the binder resin may be 10 to 40 parts by weight with respect to 100 parts by weight metal catalyst, and in another embodiment, 15 to 25 parts by weight. When the binder resin is less than 10 parts by weight, the ion transferring property may be insufficient and the binding properties of the catalyst may be insignificant, which is undesirable. When it is added in more than 40 parts by weight, the reaction area of the catalyst is reduced, which is also undesirable.

Ingredients of the composition for forming a catalyst layer may be mixed uniformly by mechanical agitation or ultrasonic agitation.

Subsequently, an electrode substrate or a polymer electrolyte membrane is coated with the composition for forming a catalyst layer in a conventional method to thereby form a catalyst layer.

The coating method may include, but is not limited to, screen printing, spray coating, doctor blade methods, gravure coating, dip coating, silk screening, painting, slot die coating, and so on, depending on the viscosity of the composition. According to a one embodiment, a screen printing method is used.

When a catalyst layer is formed on an electrode substrate, a polymer electrolyte membrane is assembled with the catalyst layer of the electrode substrate to fabricate a membrane-electrode assembly. Alternatively, when a catalyst layer is formed on a polymer electrolyte membrane, an electrode substrate is assembled with the catalyst layer of the polymer electrolyte membrane to fabricate a membrane-electrode assembly.

In one embodiment, the electrode substrate and the polymer electrolyte membrane are the same as described above. Assembly of the membrane-electrode assembly can be carried in accordance with well-known methods, and therefore a detailed description is omitted.

Since the membrane-electrode assembly prepared in the above preparation method includes the liquid crystal material in the catalyst layer, the reaction area of the catalyst layer can be increased. Also, the membrane-electrode assembly can reduce the influx resistance against reactants because the catalyst layer provides a path for fuel and an oxidant due to the vertical arrangement of the liquid crystal material. Also, it is possible to quickly remove reaction products, which are carbon dioxide and water, when the fuel cell is operated. Accordingly, the membrane-electrode assembly of the present invention can improve the power of the fuel cell.

According to another embodiment of the present invention, a fuel cell system includes the above membrane-electrode assembly.

The fuel cell system includes at least one electricity generating element, a fuel supplier, and an oxidant supplier.

The electricity generating element includes a membrane-electrode assembly and separators (also referred to bipolar plates). The membrane-electrode assembly includes a polymer electrolyte membrane, and a cathode and an anode positioned at each side of the polymer electrolyte membrane. The electricity generating element generates electricity through oxidation of fuel and reduction of an oxidant.

The fuel supplier plays a role of supplying the electricity generating element with a fuel including hydrogen, and the oxidant supplier plays a role of supplying the electricity generating element with an oxidant. The oxidant includes oxygen or air.

In one embodiment, the fuel includes liquid or gaseous hydrogen, or a hydrocarbon-based fuel such as methanol, ethanol, propanol, butanol, or natural gas.

Figure 2:
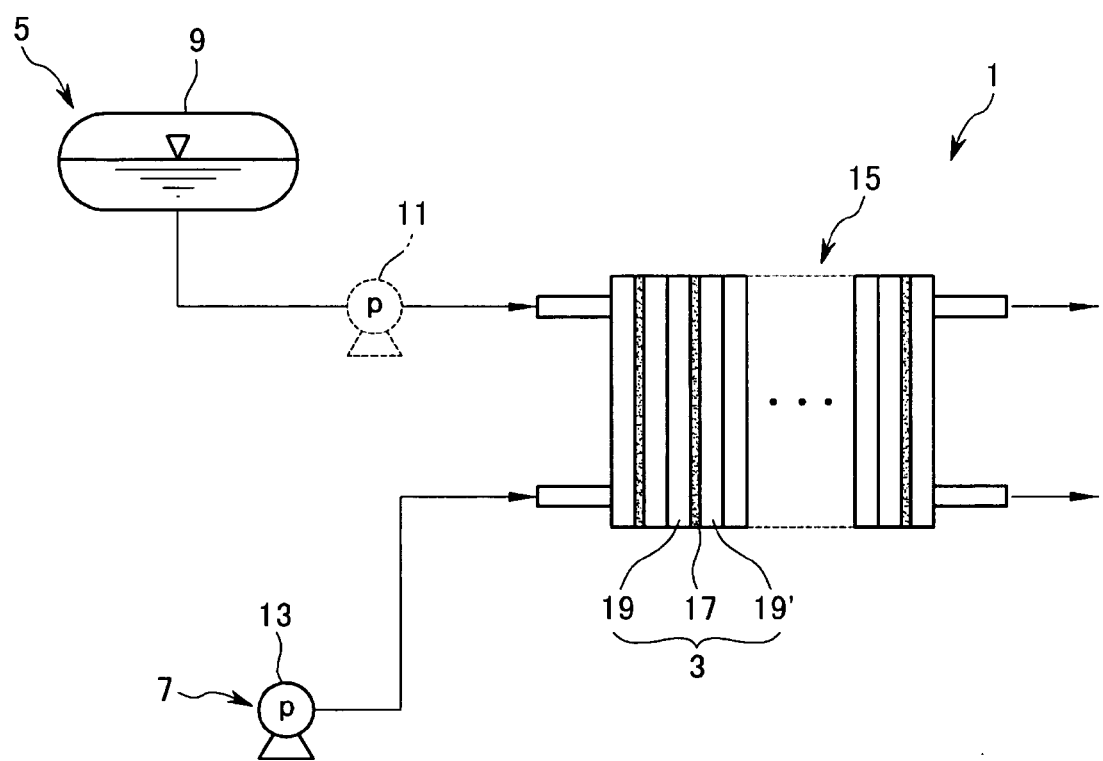
FIG. 2 schematically shows the structure of a fuel cell system according to one embodiment of the present invention.

FIG. 2 shows a schematic structure of a fuel cell system that will be described in detail with reference to this accompanying drawing as follows. FIG. 2 illustrates a fuel cell system wherein a fuel and an oxidant are provided to the electricity generating element through pumps, but the present invention is not limited to such structures, and the fuel cell system of the present invention alternately includes a structure wherein a fuel and an oxidant are provided in a diffusion manner.

The fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9, which stores fuel, and a fuel pump 11, which is connected therewith. The fuel pump 11 supplies fuel stored in the tank 9 to the stack 15.

The oxidant supplier 7, which supplies the electricity generating element 3 with an oxidant, is equipped with at least one pump 13 for supplying an oxidant to the stack 15.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly and supply hydrogen or a fuel, and an oxidant, respectively. At least one electricity generating element 3 constitutes a stack 15.

The following examples illustrate the present invention in more detail. However, it is understood that the present invention is not limited by these examples.

EXAMPLE 1

6.0 g 10 wt % NAFION® water dispersible solution prepared by using NAFION® produced by the Dupont Company was dripped into 9 ml isopropyl alcohol including 3.0 g catalyst of Pt black (HISPEC® 1000 produced by the Johnson Matthey Company) and Pt/Ru black (HISPEC® 6000 produced by the Johnson Matthey Company), and then the mixture was mechanically agitated. Subsequently, 0.45 g of liquid crystal material, cholesteryl benzoate (aspect ratio: 1:5, average length: 4 nm), was added to the mixture, and mechanical agitation and ultrasonic agitation were conducted three times at an interval of 30 minutes. The mixture was further agitated mechanically by using a magnet agitator for 12 hours to thereby prepare a composition for forming a catalyst layer.

One side of 10% water-repellent TGPH090 carbon paper was coated with the catalyst layer forming composition by using a 150-mesh stainless steel mask in an area of 5×5 $cm^2$ and a thickness of 50 mm. The carbon paper coated with the catalyst layer was dried in a drying chamber in a nitrogen atmosphere at 80° C. for 6 hours to evaporate the solvent and thereby prepare a cathode. An anode was prepared in the same method.

A membrane-electrode assembly was prepared by treating commercial NAFION® 115 membranes having a thickness of 125 μm in 3% hydrogen peroxide and 0.5 M sulfuric acid aqueous solution at 100° C. for one hour, individually, rinsing the NAFION® 115 membranes in deionized water at 100° C. for one hour, disposing a prepared polymer electrolyte membrane between the above-prepared cathode and anode, and applying heat and pressure thereto.

The membrane-electrode assembly was interposed between two gaskets and then interposed between two separators equipped with a flow channel and a cooling channel of a predetermined shape, and then compressed between copper-end plates to fabricate a single cell.

EXAMPLE 2

A single cell was fabricated according to Example 1, except that 0.75 g of liquid crystal material (aspect ratio: 1:5, average length: 4 nm), cholesteryl benzoate, was used.

EXAMPLE 3

A single cell was fabricated according to Example 1, except that 1.05 g of liquid crystal material (aspect ratio: 1:5, average length: 4 nm), cholesteryl benzoate, was used.

EXAMPLE 4

A single cell was fabricated according to Example 1, except that 0.45 g of liquid crystal material (aspect ratio: 1:15, average length: 8 nm), poly(methyl)glutamate, was used.

EXAMPLE 5

A single cell was fabricated according to Example 1, except that 0.45 g liquid crystal material (aspect ratio: 1:12, average length: 10 nm), poly(methyl)glutamate, was used.

EXAMPLE 6

A single cell was fabricated according to Example 1, except that 0.45 g of liquid crystal material (aspect ratio: 1:8, average length: 10 nm), poly(methyl) glutamate, was used.

EXAMPLE 7

A single cell was fabricated according to Example 1, except that 0.45 g of liquid crystal material (aspect ratio: 1:8, average length: 40 nm), poly(methyl)glutamate, was used.

COMPARATIVE EXAMPLE 1

A single cell was prepared according to Example 1, except that a catalyst layer forming composition was prepared by dripping 6.0 g 10 wt % NAFION® water dispersible solution prepared by using NAFION® produced by the Dupont Company into 9 ml isopropyl alcohol including 3.0 g catalyst of Pt black (HISPEC® 1000 produced by the Johnson Matthey Company) and Pt/Ru black (HISPEC® 6000 produced by the Johnson Matthey Company), and then mechanically agitating the mixture.

With respect to the single cells fabricated in accordance with Examples 1 to 7 and Comparative Example 1, 1 M methanol and dried air were individually supplied, and the cells were operated at 70° C. for 10 hours. Then, operation voltage was measured. The measurement results of Example 1 and Comparative Example are shown in Table 1.

TABLE 1

|  | Example 1 | Comparative Example 1 |
|---|---|---|
| Voltage (V) at 200 mA/cm$^2$ | 0.5 | 0.41 |

It can be seen from Table 1 that the single cell of Example 1 that includes a liquid crystal material in the catalyst layer showed a higher operation voltage than the single cell of Comparative Example 1 under the same operation conditions. This signifies that the single cell of Example 1 has an excellent power characteristic. Examples 2 to 7 show similar results.

The membrane-electrode assembly for a fuel cell of the present invention can maximize catalyst efficiency due to increases of the reaction area, and can easily implement the supply of fuels and the removal of reaction products during cell operation, resulting in providing a fuel cell with excellent power characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A membrane-electrode assembly for a fuel cell, comprising:
    an anode and a cathode facing each other, wherein at least one of the anode and cathode comprises:
        an electrode substrate; and,
        a metal catalyst layer disposed on the electrode substrate, the metal catalyst layer including a mixture of a metal catalyst and a liquid crystal material, wherein the liquid crystal material comprises at least one material selected from the group consisting of cholesteryl benzoate, para-azoxyphenetol, para-methoxy cinnamic acid, sodium oleate, polyamides, polybenzothiazole, aromatic polyesters, poly(alkyl) glutamate, and combinations thereof; and,
    a polymer electrolyte membrane interposed between the anode and cathode,
    wherein the liquid crystal material has an aspect ratio in the range of 1:5 to 1:20.

2. The membrane-electrode assembly of claim 1, wherein the liquid crystal material is in the form of a nano node having an average length less than or equal to 50 nm.

3. The membrane-electrode assembly of claim 1, wherein the liquid crystal material is included in an amount of 2 to 20 parts by weight with respect to 100 parts by weight of the metal catalyst.

4. The membrane-electrode assembly of claim 1, wherein the metal catalyst comprises at least one material selected from the group consisting of platinum, ruthenium, osmium, platinum-ruthenium alloys, platinum-osmium alloys, platinum-palladium alloys, platinum-M alloys, where M is a transition element selected from the group consisting of Ga, Ti, V, Cr, Mn, Fe, Co, Ni, Cu, Zn, Sn, Mo, W, Rh, Ru, and mixtures thereof, and combinations thereof.

5. The membrane-electrode assembly of claim 1, wherein the amount of the metal catalyst is 50 to 80 wt % based on the total weight of the catalyst layer.

6. A membrane-electrode assembly for a fuel cell, wherein the membrane electrode assembly comprises:
    an anode and a cathode facing each other, wherein at least one of the anode and cathode comprises:
        an electrode substrate; and,
        a metal catalyst layer disposed on the electrode substrate, the metal catalyst layer including a metal catalyst and a liquid crystal material, wherein the liquid crystal material comprises at least one material selected from the group consisting of cholesteryl benzoate, para-azoxyphenetol, para-methoxy cinnamic acid, sodium oleate, polyamides, polybenzothiazole, aromatic polyesters, poly(alkyl)glutamate, and combinations thereof, and the catalyst layer further comprises an ion conductive binder; and,
    a polymer electrolyte membrane interposed between the anode and cathode,
    wherein the liquid crystal material has an aspect ratio in the range of 1:5 to 1:20.

7. The membrane-electrode assembly of claim 6, wherein the binder comprises a proton conductive polymer resin with a cation exchange group at its side chain selected from the group consisting of a sulfonic acid group, a carboxylic acid group, a phosphoric acid group, a phosphonic acid group, and derivatives thereof.

8. The membrane-electrode assembly of claim 6, wherein the amount of binder is 10 to 40 parts by weight based on 100 parts by weight of the metal catalyst.

9. The membrane-electrode assembly of claim 1, wherein the catalyst layer has a thickness less than or equal to 400 μm.

10. The membrane-electrode assembly of claim 1, wherein the electrode substrate is selected from the group consisting of carbon paper, carbon cloth, carbon felt, and metal cloth.

11. The membrane-electrode assembly of claim 1, wherein the polymer electrolyte membrane comprises a polymer resin having a cation exchange group at its side chain selected from the group consisting of a sulfonic acid group, a carboxylic acid group, a phosphoric acid group, a phosphonic acid group, and derivatives thereof.

12. The membrane-electrode assembly of claim 1, which further comprises a microporous layer that is disposed on the electrode substrate and comprises a conductive powder and a binder resin.

13. A fuel cell system comprising:
at least one electricity generating element adapted to generate electricity from electrochemical reactions of a fuel and an oxidant, comprising:
a membrane-electrode assembly comprising:
an anode and a cathode facing each other, wherein at least one of the anode and cathode comprises:
an electrode substrate; and,
a metal catalyst layer disposed on the electrode substrate, the metal catalyst layer including a mixture of a metal catalyst and a liquid crystal material, wherein the liquid crystal material comprises at least one material selected from the group consisting of cholesteryl benzoate, para-azoxyphenetol, para-methoxy cinnamic acid, sodium oleate, polyamides, polybenzothiazole, aromatic polyesters, poly(alkyl) glutamate, and combinations thereof;
a polymer electrolyte membrane interposed between the anode and cathode;
separators disposed at each side of the membrane-electrode assembly;
a fuel supplier adapted to supply a fuel to the electricity generating element; and
an oxidant supplier adapted to supply an oxidant to the electricity generating element,
wherein the liquid crystal material has an aspect ratio in the range of 1:5 to 1:20.

14. The fuel cell system of claim 13, wherein the liquid crystal material is in the form of a nano node having an average length less than or equal to 50 nm.

15. The fuel cell system of claim 13, wherein the amount of liquid crystal material is 2 to 20 parts by weight with respect to 100 parts by weight of the metal catalyst.

* * * * *